Nov. 15, 1949 G. O. HOFFSTETTER 2,488,407
CONVEYER DRIVE ATTACHMENT
Filed May 6, 1947 2 Sheets-Sheet 1
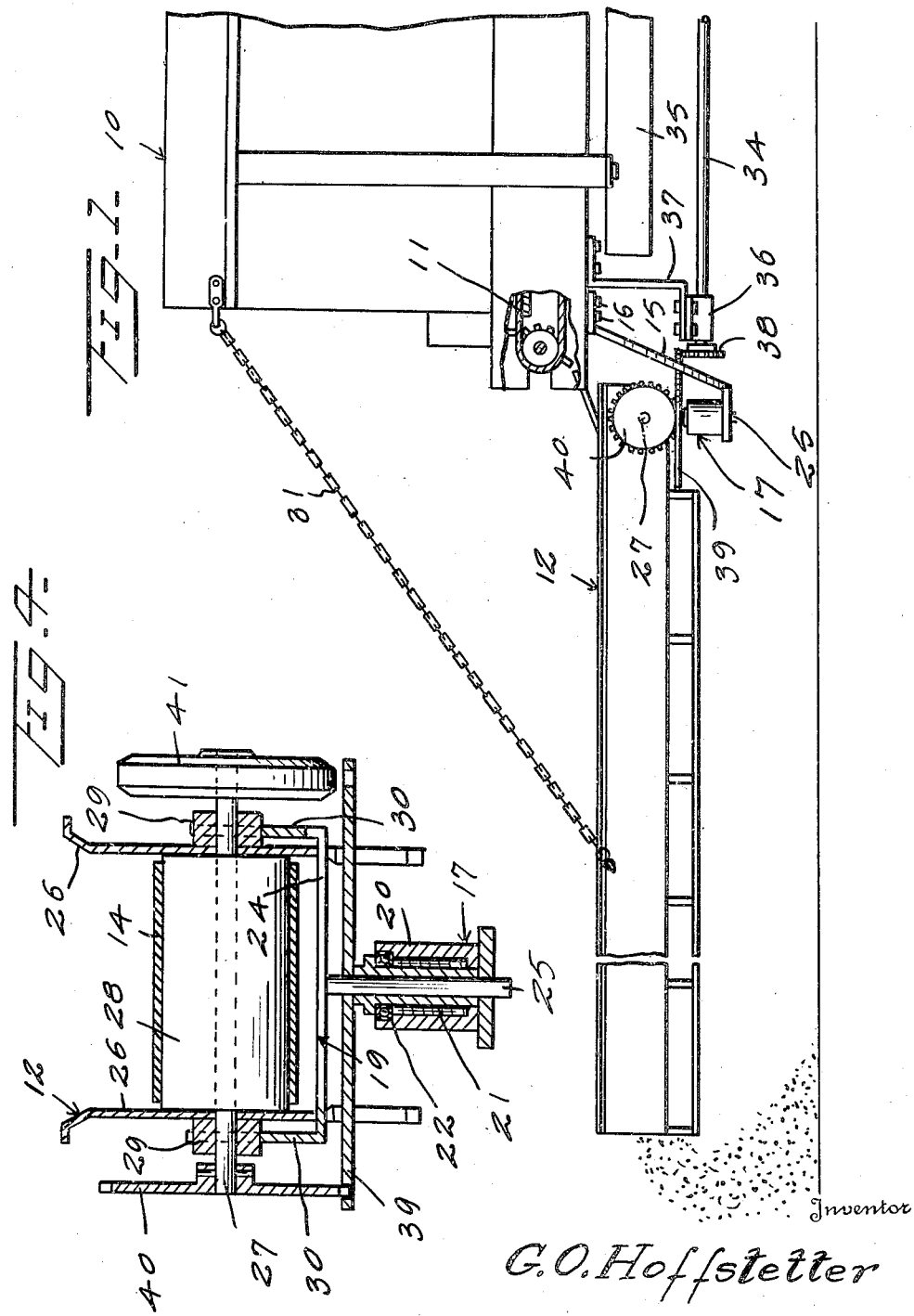
Inventor
G. O. Hoffstetter
By Kimmel & Crowell
Attorneys

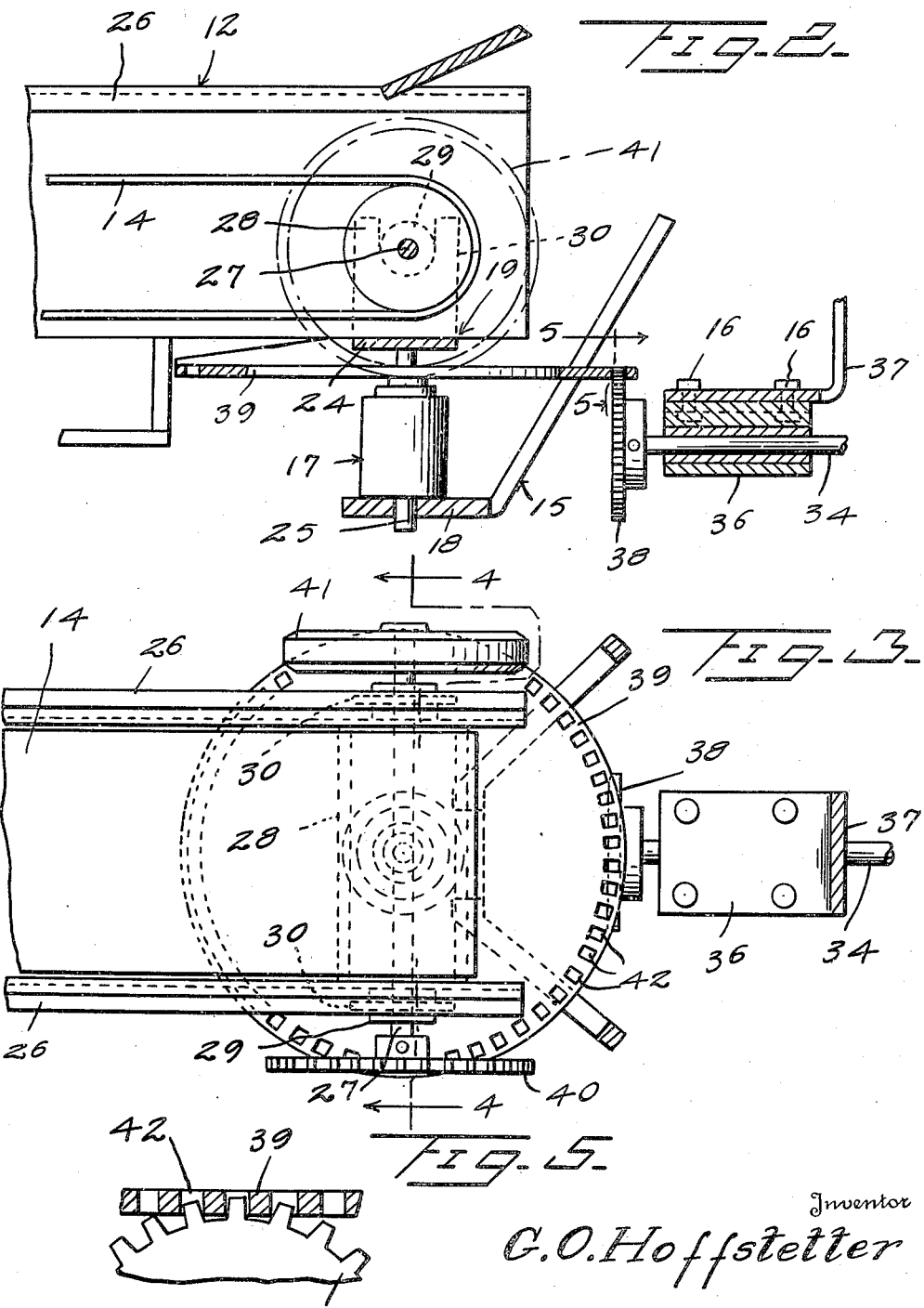

Patented Nov. 15, 1949

2,488,407

UNITED STATES PATENT OFFICE 2,488,407

CONVEYER DRIVE ATTACHMENT

George O. Hoffstetter, Jerseyville, Ill.

Application May 6, 1947, Serial No. 746,382

2 Claims. (Cl. 214—83.26)

This invention relates to self-unloading hoppers, and more particularly to trucks or the like having a hopper body with a conveyor in the bottom for discharging material from the hopper and a second or auxiliary conveyor carried by the truck for taking the material from the first conveyor to a point remote from the hopper.

It is an object of this invention to provide a conveyor drive for attachment to a self-unloading truck and a support on the truck for the conveyor, whereby the conveyor may be swung in a vertical and in a horizontal plane and still maintain a driving connection between the truck and the conveyor. In this manner, the conveyor may be swung to a vertical position for and during movement of the truck, and lowered as far as desired to the rear or to either side of the rear of the truck for unloading material from the truck and depositing the material at a point remote from the hopper.

Another object of this invention is to provide an unloader attachment of the kind to be more particularly described hereinafter, which may be readily attached to present trucks having unloader conveyors in the hopper body or which may as readily be incorporated into new trucks during the manufacture thereof.

Still another object of this invention is to provide a conveyor drive attachment of this kind which is formed of a minimum number of parts whereby the attachment may be readily and economically manufactured and distributed while still maintaining the high degree of efficiency demanded in work of this kind. This type of unloader is adapted for use in unloading coal or other material from a truck directly into a bin, and for distributing material along a road either in the road or along the edges while the truck is in motion.

With the above and other objects in view, my invention consists in the arrangement, combination and details of construction disclosed in the drawings and specification, and then more particularly pointed out in the appended claims.

In the drawings,

Figure 1 is a side elevation, partly broken away and partly in section, of a conveyor drive attachment and hopper constructed according to an embodiment of this invention, Figure 2 is a side elevation, partly broken away and partly in section, of the universal connection between the hopper and the conveyor attachment.

Figure 3 is a top plan view of the universal connection of Figure 2,

Figure 4 is a transverse section taken on the line 4—4 of Figure 3,

Figure 5 is a fragmentary detail section taken on the line 5—5 of Figure 2.

Referring to the drawings, the numeral 10 designates generally the rear body or hopper of a truck, having a belt conveyor 11 operatively mounted in the bottom for conveying material and discharging it from the rear of the hopper 10.

An auxiliary or unloading conveyor 12 is swivelly mounted on the rear end of the truck body or hopper 10 below the end of the discharge hopper 11, for carrying the material from the discharge point of the hopper 11 rearwardly to either side of the truck or hopper 10.

The conveyor attachment 12 is so connected to the rear end of the hopper 10 that it may be pivoted vertically or laterally while maintaining a driving connection between the conveyor belt 14 of the conveyor 12 and the power drive from the truck. The conveyor 12 is fixed to the rear end of the hopper 10 by a universal joint having a driving means superimposed thereon.

For supporting the conveyor 12 at the rear end of the hopper 10, a bracket 15 is fixed at its upper end to the hopper 10 by bolts 16 or other suitable fastening devices, and extends downwardly below the end thereof. A bearing 17 is fixed to or otherwise secured on the lower horizontal arm 18 of the bracket 15 and a yoke 19 is rotatably carried in the bearing 17. The bearing 17 is formed with an outer housing as 20, having a bushing 21 secured therein, and an anti-friction bearing 22 at the upper end thereof.

The yoke 19 is formed with a U-shaped supporting bracket 24, having a stem 25 extending downwardly from the base thereof. The stem 25 engages through the bearing 22 and bushing 21 for rotatably supporting the yoke 19 on the bearing 17.

The conveyor 12 is formed with a pair of side guides or members 26 extending along the side edges of the conveyor belt 14. A shaft 27 is rotatably mounted in one end of the conveyor 12 and a drum 28 is fixed on the shaft 27 over which the belt 14 is adapted to be trained.

The shaft 27 and the drum 28 provide a drawing means for the belt 14. Bosses 29 are fixed on the opposite sides of the walls 26 and engage through the arms 30 of the bracket 24. The bosses 29 provide bearings about which the conveyor 12 may be pivotally rocked. Thus, a universal support is provided for the conveyor 12 from the bracket 15.

The bearing 17 and the shaft 25 provide for the lateral movement of the conveyor 12 while the bearings 29 in the arms 30 permit the vertical movement. A flexible supporting member 31 such as a chain or cable, is adapted to be secured between the upper end of the hopper 10 and the outer end of the conveyor 12, for supporting the conveyor in a vertically selected position.

For driving the belt 14 of the conveyor 12 there is provided a drive shaft 34 supported beneath the frame 35 of the truck body. A bearing 36 is fixedly secured to the lower end of a bracket 37 at the rear end of the hopper 10 for rotatably mounting the rear end of the drive shaft 34. A gear 38 is fixed to the rear end of the shaft 34 and is disposed in a vertical plane transversely of the body 10.

A gear 39 is loosely carried by the shaft 25 above the bearing 17. The gear 39 is loose on the shaft 25 and is free to rotate independently thereof. The gear 39 is disposed in a horizontal plane perpendicular to the plane of the gear 38 and is adapted to be engaged with the teeth thereof along its periphery.

A gear 40 is fixed to one end of the shaft 27 outwardly of the arms 30 of the yoke 19. The gear 40 is adapted to engage with the gear 39 for rotation therewith, and is disposed in a vertical plane at right angles to the plane of the gear 39.

A fly wheel or counterweight 41 is fixed on the shaft 27 opposite from the gear 40 for counter balancing the thrust on the shaft 27 due to the power applied at one end through the gear 40. The gear 39 is provided with annularly spaced apart openings 42 engageable with the teeth of the gear 38 and the gear 40. While this type of gear is shown in the drawings, other suitable types of gears as beveled gears may be applied with equal efficiency.

The conveyor 12 is free to rotate in a vertical plane about the shaft 27 and in a horizontal plane about the stem 25. As the shaft 27 is the pivot point of the conveyor 12, and also the axis of the gear 40, the shaft 27 will not be displaced upon vertical movement of the conveyor 12 and the gear 40 will remain in engagement with the gear 39. As the stem 25 is the axis of the gear 39 and also the axis of the horizontal movement of the conveyor 12, neither the shafts 25 or 27 will be displaced upon horizontal movement of the conveyor. As the conveyor is moved from side to side, the gear 40 will be displaced annularly about the gear 39, while the teeth of the correlated gears remain in operative engagement.

I do not mean to confine myself to the exact details of construction herein disclosed, but claim all variations falling within the purview of the appended claims.

What I claim is:

1. In a self unloading truck having a hopper body and a belt conveyor swivably mounted on said truck, a conveyor drive attachment comprising a bearing member fixed on the rear end of the truck, a U-shaped conveyor supporting bracket having a stem depending from the base thereof rotatably engaging in said bearing, a gear rotatable about said stem between said bearing and said base, a conveyor drive shaft rotatably supported between the arms of said bracket, a gear on one end of said shaft engaging said first mentioned gear on the upper surface, and a driving gear carried by said truck engaging said first mentioned gear on the lower side thereof thereby providing a universal support and driving connection for said conveyor on said truck.

2. In a self unloading truck having a hopper body and a belt conveyor swivably mounted on said body for unloading material from said hopper, a conveyor support and driving attachment comprising a bearing member on said body, a U-shaped conveyor supporting bracket, a stem depending from the base of said bracket and engaging in said bearing, a gear rotatable about said stem between said base and said bearing, a conveyor drive shaft rotatable between the arms of said bracket, a driven gear fixed on said shaft engaging said first mentioned gear on one side thereof, and a driving gear rotatably carried by said truck engaging said first mentioned gear on the other side, whereby a swivel support and universal driving connection is provided for said conveyor.

GEORGE O. HOFFSTETTER.

REFERENCES CITED

The following references are of record in the file of this patent:

UNITED STATES PATENTS

| Number | Name | Date |
|---|---|---|
| 1,762,240 | Pickard | June 10, 1930 |
| 2,107,682 | Wall | Feb. 8, 1938 |
| 2,419,824 | Davis | Apr. 29, 1947 |
| 2,431,000 | Step | Nov. 18, 1947 |